United States Patent [19]

Rondeau

[11] Patent Number: 5,734,643
[45] Date of Patent: Mar. 31, 1998

[54] METHOD AND APPARATUS FOR TRANSMITTING DATA OVER A RADIO COMMUNICATIONS NETWORK

[75] Inventor: Michael N. Rondeau, Forest, Va.

[73] Assignee: Ericsson Inc., Research Triangle Park, N.C.

[21] Appl. No.: 546,892

[22] Filed: Oct. 23, 1995

[51] Int. Cl.$^6$ ........................................................ H04J 3/16
[52] U.S. Cl. ............................ 370/279; 370/315; 370/324
[58] Field of Search ............................... 370/95.1, 95.2, 370/115.3, 94.1, 60, 60.1, 31, 24, 274, 279, 285, 280, 293, 294, 296, 310, 312, 315, 324, 326, 329, 338, 341, 343, 345, 346–350, 384, 447, 401, 503, 501; 455/15, 51, 11.1, 13.2, 16; 375/211, 355

[56] References Cited

U.S. PATENT DOCUMENTS

| | | | |
|---|---|---|---|
| 4,599,719 | 7/1986 | Breen et al. | 370/24 |
| 4,841,521 | 6/1989 | Amada et al. | 370/31 |
| 4,924,479 | 5/1990 | Iwao et al. | 370/31 |
| 5,121,382 | 6/1992 | Yang et al. | 370/31 |
| 5,365,516 | 11/1994 | Jandrell | 370/337 |
| 5,396,486 | 3/1995 | Scott | 370/31 |
| 5,533,015 | 7/1996 | Makowski et al. | 370/31 |

FOREIGN PATENT DOCUMENTS

| | | |
|---|---|---|
| 0 566 957 | 10/1993 | European Pat. Off. . |
| 2243974 | 11/1991 | United Kingdom . |
| 89 11126 | 11/1989 | WIPO . |
| 89 11193 | 11/1989 | WIPO . |

*Primary Examiner*—Dang Ton
*Attorney, Agent, or Firm*—Nixon & Vanderhye P.C.

[57] ABSTRACT

In a trunked radio data communications system using half-duplex radios, plural data messages are exchanged over a single RF working channel using a technique where a working channel repeater assigned to a data call sends status messages to both the data originating radio and the data receiving radio indicating which radio is currently enabled to transmit a data message over the working channel. Each time the currently enabled radio sends a data message to the working channel repeater, the repeater changes the status message so that the other radio can respond. As a result, data messages can be efficiently and reliably exchanged over the same working channel without collision or having to request and set up a new working channel for each data message.

27 Claims, 5 Drawing Sheets

METHOD AND APPARATUS FOR TRANSMITTING DATA OVER A RADIO COMMUNICATIONS NETWORK

FIELD OF THE INVENTION

The present invention relates to a method and apparatus for transmitting data over a radio communications network, and more particularly, to minimizing radio channel request and set-up procedures for data message exchanges over the radio network.

BACKGROUND AND SUMMARY OF THE INVENTION

Trunked radio repeater systems are well known especially in the context of public service trunked (PST) radio applications used by police and fire departments, emergency/rescue services, etc. In trunked systems, a relatively small number of radio repeaters are used to efficiently service all of the radio communication needs within a given geographic area by sharing those repeaters on an "as-needed" basis between all radio units. In addition to portable/mobile voice radio communications, PST radios are also used to transmit and receive computer data communications over a radio communications network using mobile radio data terminals (RDTs) which are connected to the mobile radios.

Figure 1:
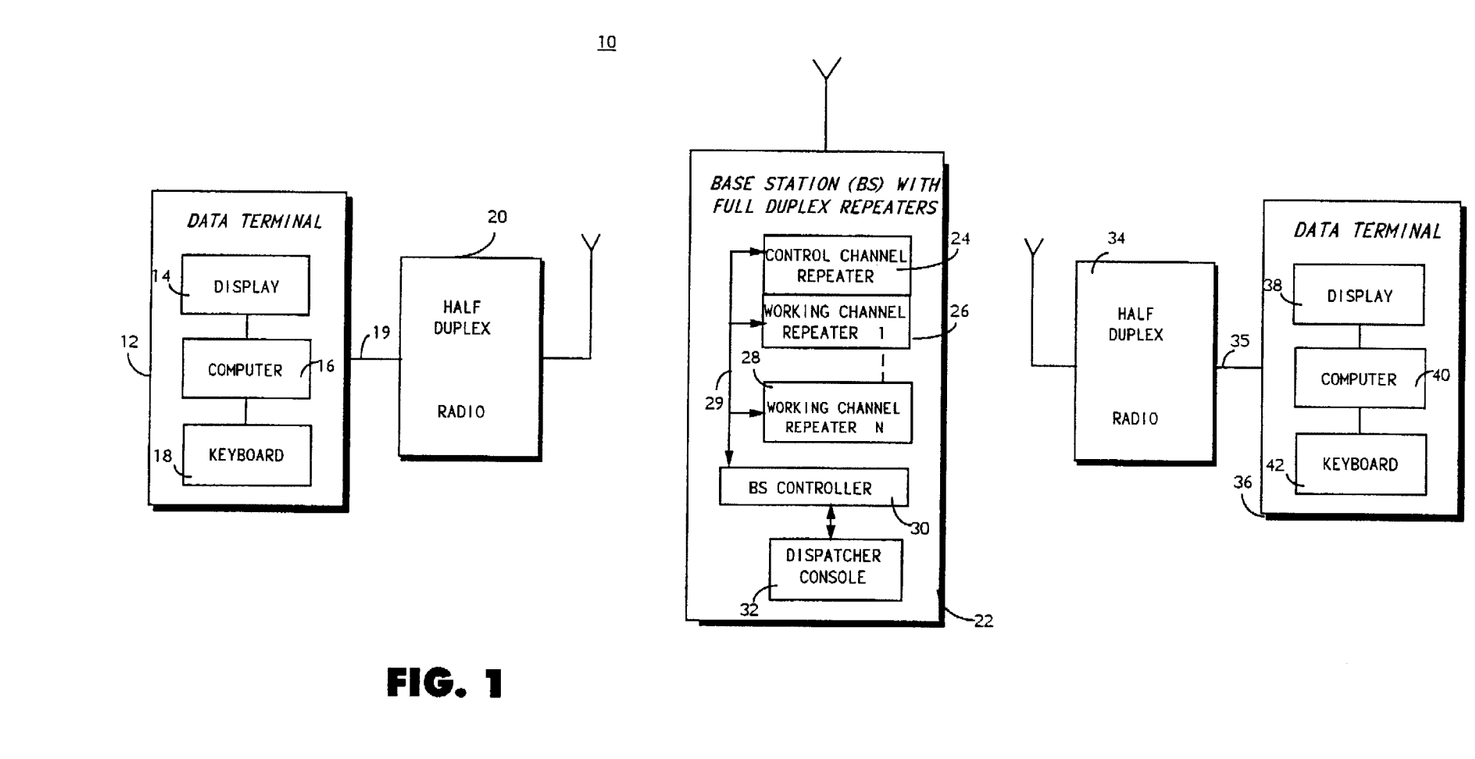
FIG. 1 is a radio data communications system that may used in accordance with the invention.

An exemplary trunked radio repeater system for data communications in accordance with this invention is illustrated in FIG. 1. As illustrated, individual mobile radio data terminals 12 and 36 and corresponding radios 20 and 34 communicate with each other (and other radio units) via a shared radio repeater working channel located at a trunked base station control site 22. A dispatch console 32 may be housed directly at the base station site 22 or may be remotely located at other communications facilities. Conventional transmitting and receiving RF antenna circuitry individually services a plurality of duplex RF channel transceivers included in a plurality of repeaters 24, 26, and 28. Each repeater is controlled by programmed data processing and/or digital signal processing circuitry. Typically, each repeater 24, 26, and 28 communicates with one another and with an optional base station controller 30 by way of a data bus 29.

Radios 20 and 34 are half-duplex radios which can transmit and receive but not simultaneously. These radios are also controlled with suitably programmed data processing and/or digital signal processing circuitry and include a display, a keypad, a push-to-talk (PTT) switch, and audio circuits which provide basic analog audio outputs to the speaker and accept analog inputs from a microphone. The radios are connected by a suitable digital interface and modem link to respective data terminals 12 and 36. Each data terminal 12 and 36 includes a display 14, computer 16 (such as a personal computer (PC)), and keyboard 18 with appropriate interface and input/output circuitry (not shown).

Control of repeater working channels is orchestrated by the control channel repeater 24 over a digital radio frequency control channel. The radios monitor the control channel when not actively engaged on a working channel, e.g., with a data communication. When a radio wants to transmit on a radio working channel, it first makes a request for a working channel over the control channel to the control channel repeater 24. The control channel repeater 24 assigns an available working channel repeater and sends a working channel assignment message to the requesting radio and to the intended receiving radio. The sending/originating radio transmits its message over the working channel which is received and echoed (in full-duplex mode) by the assigned working channel repeater to the receiving radio. At the end of the radio message transmission, the working channel is "dropped." Any subsequent communication between the two radios must be originated using the same channel request and assignment procedure orchestrated through the control channel repeater as described above.

Data messages are formatted and processed using data network protocols such as transmission control protocol/internet protocol (TCP/IP). One example method of transmitting a data message by an "originating" radio is to divide the data message into one or more data frames (sometimes referred to as bursts or fragments). Each data frame is further broken down into multiple packets with an error detection code attached to each packet. When a data frame is received, the radio checks each packet for errors and transmits back an acknowledgement message that contains a bit map with one bit for each packet. Incorrectly received packets are retransmitted by the originating radio in the next data frame, and if there is room, new data may be packetized and added after the repeated packets. If the receiving radio misses the data frame or the originating radio misses the acknowledgement signal, the originating radio eventually times out and resends the message. A flag or sequence number in the message tells the receiving radio that this is a repeat message.

While the above-described call request and access procedure for each radio transmission referred to as "transmission trunking" is quite satisfactory for voice communications, it is less so for data communications which require an immediately returned application "acknowledge" message from the receiving data terminal to the originating data terminal after each data message is sent and received in accordance with data network protocols. It is both inefficient and time-consuming to request and access a radio working channel using the control channel request and grant procedure for each data message. The time required to transmit an application acknowledge message, for example, is considerably shorter than the time needed to request, set up, and tune to the radio working channel over which the acknowledge message is transmitted. In fact, using conventional data communications protocols, the data originating radio may "time out" before an acknowledge message is received from the intended radio. As a result, the originating radio will incorrectly assume an error in transmission and will unnecessarily retransmit the message as a result of the RF channel set up delay time.

A solution to this problem is to establish a two-way radio link in between the radios using an assigned full duplex working channel repeater that permits the radios to both receive and transmit data messages over the same radio working channel. However, PST radios are generally half-duplex meaning they cannot receive and transmit at the same time. Therefore, this solution requires that a full duplex channel be "simulated" using half-duplex radios. Full duplex simulation using half-duplex radios may be achieved by extending the "hang time" period that follows when the transmitting radio ceases transmitting. A receiving radio may then transmit its own data message, e.g., an acknowledge, on that same working channel before the hang time expires causing the radio working channel to be "dropped." Consequently, the receiving radio does not need to go through the control channel to request and access a working channel before it acknowledges (and possibly sends a new data message). This kind of simulated full-duplex mode of operation is referred to as "message trunking."

Message trunking is practical in analog voice radio applications for two reasons. First, people generally know when one party has finished speaking before responding so that two or more radios are usually not transmitting on the channel simultaneously. Second, even if two radios do simultaneously transmit, analog voice "sums" so that the parties generally understand what is said. But this is not the case for digital data. If there is no mechanism that controls which radio will transmit on the radio channel at a particular time, the data messages will "collide" resulting in an unsuccessful communication. A mechanism is needed therefore that permits data communications to be implemented using half-duplex radios operating in a message trunked mode without collision.

The present invention provides an efficient and reliable mechanism by which half-duplex radios communicate data messages in a message trunked mode without collision. By establishing a simulated "full-duplex radio link," the invention eliminates the call set-up time for each data message and acknowledgement. In addition, acknowledgements and other data messages are quickly exchanged by the radios thereby avoiding wasteful time outs and unnecessary data retransmissions. Using a simple arbitration technique, collisions are eliminated as is "thrashing" where two radios continuously transmit messages which collide and then retransmit those same messages at similar times resulting in even more collisions.

More specifically, plural data messages are transmitted over a single RF working channel using a technique where a working channel repeater assigned to a data call sends status messages to both the data originating radio and data receiving radio indicating which radio is currently enabled to transmit a data message over this working channel. Each time the currently enabled radio sends a data message to the working channel repeater, the repeater changes the status message so that the receiving radio knows it can now respond. In this way, collisions are avoided.

In a preferred example embodiment of the present invention, the working channel repeater repeatedly transmits synchronization messages over the assigned radio working channel when the repeater is not actively receiving or retransmitting a data message over that working channel. Embedded in each synchronization message is an identification (ID) of the radio currently enabled to transmit a data message over the working channel. After the working channel is set up initially, the synchronization message includes the ID of the originating radio. After receiving and echoing the message of the originating radio, the working channel repeater changes the ID in the synchronization message to enable the receiving radio. The receiving radio then may acknowledge the received message, indicate any errors transmitted in the packets received in that message, and/or attach its own other data message. Accordingly, the radio ID may be viewed as one example parameter that may be used by the working channel repeater to arbitrate which radio may send a message. Other parameters could be used.

If the working channel repeater fails to receive the message from the originating radio, the working channel repeater does not change the radio ID in the synchronization message. Having just transmitted and having switched to a receive mode on the working channel, the originating radio detects the synchronization message and recognizes that the radio ID is not changed. As a result, the radio concludes that its original data message transmission was not received by the working channel repeater, returns to the transmit mode, and retransmits the message. This will be done several times before the radio gives up and aborts the call.

In a situation where a receiving radio does not receive a message echoed by the working channel repeater, the receiving radio detects that the radio ID has changed in the synchronization message, and as a result, sends an acknowledgement signal (possibly with a data frame attached) requesting that the entire frame be retransmitted. There is no need for lengthy time out periods. Each radio knows right away whether a message it transmitted was received and echoed by the repeater and whether it should have received a message by monitoring the ID. Each radio also knows when it is permitted to transmit its data message so there are no collisions or thrashing.

The invention also provides for efficient message exchange procedures in unsuccessful or less than optimal communication scenarios. If for example the data receiving radio is turned off or listening on another working channel, it will/may not detect the original working channel assignment message on the control channel. As a result, the receiving radio likely will not receive the message from the originating radio. When the originating radio sends out a data message on the assigned working channel, it will not receive an acknowledgement and will eventually time out. However, the time out period need only be long enough to permit a receiving radio to attempt several retries to return an acknowledgement. After that brief time out expires, the originating radio does know not to waste any more time trying to reach the radio. No lengthy time outs and pointless retries need be performed by the originating radio. On the other hand, if the data receiving radio tunes to the repeater working channel but misses the data message, the data receiving radio nonetheless detects the radio ID change in the synchronization message and immediately transmits an acknowledge message requesting that the data frame be retransmitted. Thus, the originating radio waits only a short time to receive a retransmit acknowledge message from the receiving radio and/or to detect the absence of a changed synchronization message ID. In this way, the originating radio very quickly determines that the data receiving radio never recognized the working channel assignment and drops the data call without wasting any more time waiting for acknowledgement signals and/or retransmitting to an unavailable radio.

BRIEF DESCRIPTION OF THE DRAWINGS

These objects and advantages, as well as others, will be better understood from the following detailed description taken in conjunction with the accompanying drawings in which.

DETAILED DESCRIPTION OF THE DRAWINGS

In the following description, for purposes of explanation and not limitation, specific details are set forth such as particular circuits, protocols, techniques, etc. in order to provide a thorough understanding of the present invention. However, it will be apparent to one skilled in the art that the present invention may be practiced in other embodiments that depart from these specific details. In other instances, detailed descriptions of well known methods, devices, protocols, and circuits are omitted so as not to obscure the description of the present invention with unnecessary detail.

The present invention will now be described in conjunction with the data communications system shown in FIG. 1, the basic architecture and operation of which have already been described above. Although the exchange of data messages is hereafter described referring to data terminal 12, radio 20, radio 34, and data terminal 36 for purposes of illustration and description, those skilled in the art will appreciate that one of the radio and data terminal combinations may be replaced with a data gateway which is connected to another computer via conventional wireline type communications networks, e.g., Ethernet, etc. Moreover, while the data terminals are shown as the devices originating and ultimately receiving as an end destination application data messages, other devices including the radios themselves could originate and/or be the ultimate destination for application data messages. In describing the operation of the present invention in conjunction with the system shown in FIG. 1, the following abbreviations are used to identify various messages:

| | |
|---|---|
| ACK ATT: | Acknowledge Map attached |
| ACK MAP: | Acknowledge Bit Map |
| ACK_1: | An inbound acknowledge (ACK) message with a bit map of all ones indicating that all packets were received correctly. |
| ACK_0: | An inbound ACK message with a bit map containing 0s indicating that some packets were not received correctly. |
| ACK_F: | A FINAL ACK message |
| CC: | Control Channel |
| DATA: | A data frame including a header and packetized data. |
| DATA ATT: | Data Attached |
| DATA_L: | A data frame including a header packetized data with the Last Packet bit set. |
| DOR: | Data Originating Radio |
| DRR: | Data Receiving Radio |
| DT1: | Data Terminal 1 |
| DT2: | Data Terminal 2 |
| DROP: | A radio working channel drop message |
| DROP(e): | A DROP message with an error code. (0 = no error) |
| ID: | Identification number used to identify a radio, a data gateway, or a computer in or associated with the radio communications network. |
| S_DROP: | A SPECIAL DROP message |
| SYNC(x): | A synchronizing message where x = ID of a radio |
| WC: | One Repeater Working Channel (WC) |

Figure 2:
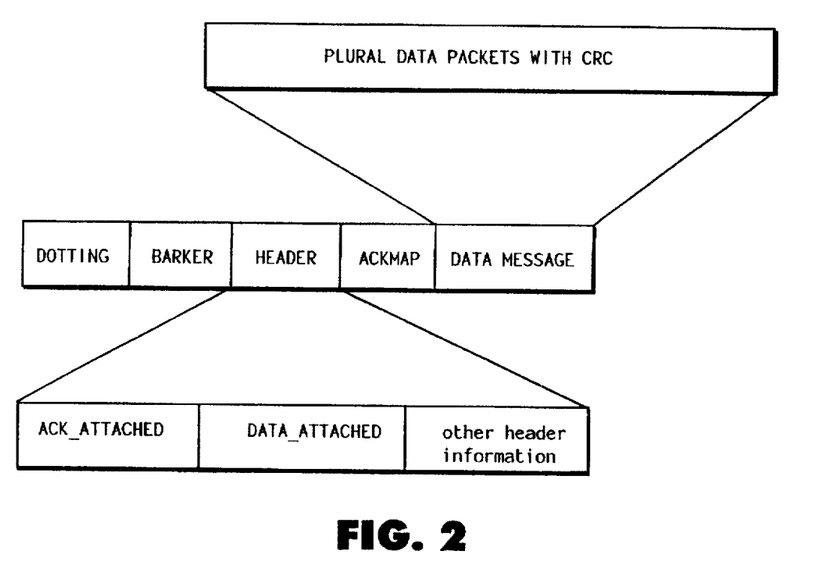
FIG. 2 illustrates the fields included in an example message frame transmitted over the radio communications network.

FIG. 2 shows an example data frame format including a dotting field for obtaining bit synchronization, a Barker field for obtaining word (i.e., an 8-bit byte) synchronization, a header field which includes protocol information required for the specific communications protocol used to transmit data frames over the radio communications network, an acknowledgement map (ACKMAP) field, and a data message field which includes multiple packets of data and error checking codes (e.g., CRC codes). The ACKMAP field is a bit field with one bit on the bit map representing the status of one packet. If the packet bit is set to 1, the associated data packet was received without errors (as determined by using conventional error detection codes); otherwise, the packet is faulty and must be retransmitted. Packets received incorrectly are typically retransmitted in the next data burst, and if there is room, new data may be packetized and added after the repeated packets. The header field includes among other things an acknowledgement attached field (ACK ATT) and a data attached (DATA ATT) field. These two fields quickly inform the radio whether the received message includes an acknowledgement map and/or a data message, respectively. Other header information might include for example the data message length. Of course, those skilled in the art will appreciate the present invention is not limited to a particular frame format or communications protocol.

Figure 3:
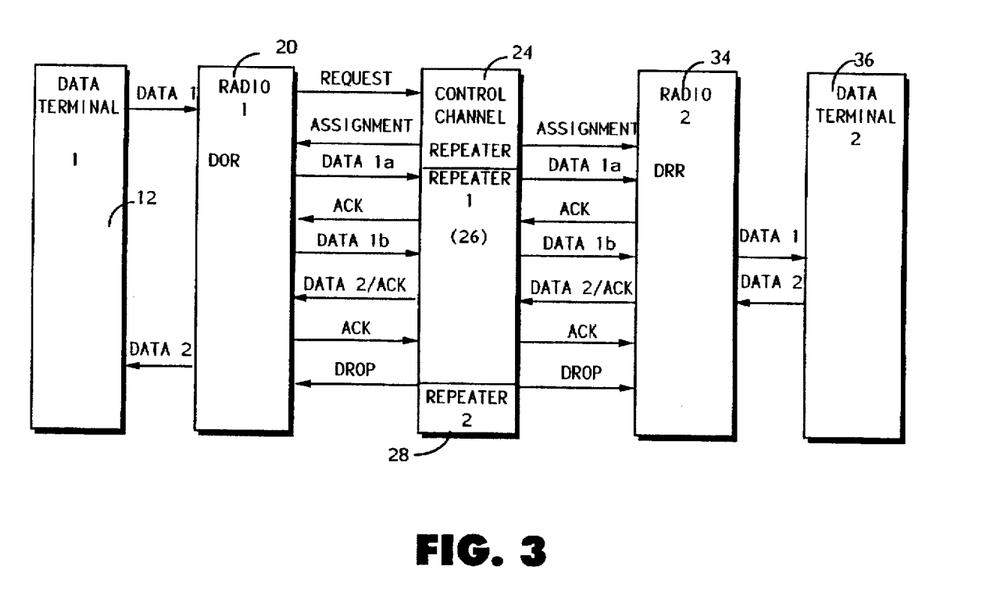
FIG. 3 is a diagram illustrating a potential messaging sequence between two data terminals over the radio communications network using the same working channel.

Reference is now made to FIG. 3 where operation of an example radio data communications system in accordance with the present invention will now be described (like reference numerals referring to like elements in the drawings). Data terminal 1 (DT1) transmits a data message (DATA 1) to a data originating radio (DOR) that is intended ultimately for data terminal 2 (DT2). Upon receipt of the data message DATA1 from DT1, the data originating radio sends a request for a working channel to the control channel repeater at the base station over the radio control channel. The control channel repeater assigns a working channel repeater and sends working channel assignment messages to the data originating radio and the data receiving radio over the control channel. Both radios tune to the assigned working channel. The data originating radio breaks the DATA1 message into packets and formats the message by adding header and error detection codes such as CRC codes to generate a DATA1a message frame which is then sent to the working channel repeater which echoes the data message frame to the data receiving radio. The data receiving radio checks the received data message for errors, and if all the packets are received correctly, sends an acknowledge message (ACK) to the working channel repeater which echoes the acknowledge message to the data originating radio. The acknowledge message (which is itself a data message) is sent on the same radio frequency working channel which was originally assigned to transmit the DATA 1 message. If any of the packets are received incorrectly, the acknowledge message indicates the "bad packets" in the ACK MAP field, and in response, the data originating radio resends those packets along with any new data (DATA1b) that did not fit into the first message frame to the working channel repeater. The data receiving radio checks the received packets from the DATA1b message, and if there are errors or more packets to be received, repeats the above procedures. Otherwise, the data receiving radio sends the DATA1 message to the receiving data terminal DT2.

If the data receiving radio receives a second data message DATA2 from the receiving data terminal DT2 before it sends the initial acknowledge message ACK, the data receiving radio formats the second data message with the necessary header, and sends the DATA2 message along with the acknowledge message to the working channel repeater which echoes it to the data originating radio. Of course, the DATA2 message could be fragmented and sent as multiple frames if it is too long for one frame as is the case for the first data message broken down into two frames DATA1a and DATA1b. If the DOR does not receive any data from the data terminal DT1 before it is ready to send an acknowledge message, only the acknowledge message is sent to the working channel repeater and echoed to the data receiving radio. This type of message exchange over the same working channel could continue indefinitely.

The working channel repeater waits for a maximum idle time out period, and if neither radio sends a data message to the working channel repeater before the maximum idle time out expires, the working channel repeater terminates the call by sending a drop message to both the data originating and receiving radios. Of course, either radio could terminate the call early by sending a specific drop message that the working channel repeater then echoes. Moreover, a maximum call length timer could be provided to terminate a data call if it continues for too long. If a data call is terminated, a new channel request can be issued for a new working channel.

Specific examples illustrating how a data call is set up, data messages are exchanged, data messages are arbitrated over the same working channel to avoid collisions, and transmission errors are handled will now be described in conjunction with Tables 1-5. Table 1 below illustrates the call request and assignment procedure for a data call.

bit DATA_L in TP2. After sending the data frame, the data originating radio waits for an acknowledge message from the working channel repeater.

TABLE 1

|  | 1 | 2 | 3 | 4 | 5 | 6 | 7 |
|---|---|---|---|---|---|---|---|
| DT1 | DATA | | | | | | |
| DOR (ID = 1) | | CH REQ on CC | | | | DATA | |
| CC | | | | ASSIGN WCx,1,2 | | | |
| WCx | | | | | SYNC (1) | SYNC (1) | DATA |
| DRR (ID = 2) | | | | | | | |

The shaded blocks indicate time periods when the data originating and receiving radios are listening on the control channel. In this sequence, data terminal DT1 sends a message to the data receiving radio, which in the next time period sends a channel request to the control channel repeater. The data originating radio then switches to receive mode to listen on the control channel for a working channel assignment. The control channel repeater assigns a working channel repeater and sends out a working channel assignment to both originating and receiving radios in time period 4 (TP4). After the working channel assignment (TP5), the working channel repeater sends out a sequence of SYNC signals (TP5-6) until it needs to repeat a data message. Each SYNC signal contains a radio ID of the radio permitted to transmit. In this case, the sync signal includes the radio ID=1 for the originating radio requesting the data transmission which is transmitted during time period 6. The working channel repeater sends the SYNC(x) signals on the RF working channel to permit both originating and receiving radios to synchronize to the working channel.

Once the radios are synchronized, the data originating radio has permission to transmit its data message, and for the single data frame no repeated packets transfer illustrated in Table 2 below, the data originating radio sets the last packet

TABLE 2

|  | 1 | 2 | 3 | 4 | 5 | 6 | 7 | 8 | 9 |
|---|---|---|---|---|---|---|---|---|---|
| DOR (ID = 1) | | DATA_L | | | | | | DROP (0) | |
| WC | SYNC (1) | SYNC (1) | DATA_L | SYNC (2) | SYNC (2) | ACK_F | SYNC (1) | SYNC (1) | S_DROP |
| DRR (ID = 2) | | | | | ACK_F | | | | |

When the working channel repeater receives the data frame, it echoes the data frame to the receiving radio in time period 3. After echoing the data frame, the working channel repeater returns to sending SYNC(x) signals (in TPs 4 and 5) having changed the x variable to the ID=2 of the data receiving radio and waits for a message from the data receiving radio.

By monitoring the sync signals, the data originating radio detects that only the data receiving radio has permission to transmit and therefore knows that the working channel received and echoed its data frame. The data receiving radio receives the data frame and checks the various packets for errors. All of the packets having been received correctly for a single frame call, the data receiving radio forwards the data to the data terminal DT2 and sends a final acknowledge message to the working channel repeater (TP5). Since the data receiving radio did not receive any data message (e.g., DATA 2) from DT2, the working channel repeater repeats the final ACK message. After the working channel repeater receives the final acknowledge message from the data receiving radio, it changes the x value for the sync signal back to the data originating radio ID. The data originating radio has no more data to send and therefore generates a drop message (TP8). After receiving the dropped message, the working channel sends a special drop command to the radio to end the data call (TP9).

The time sequence in Table 3 below illustrates the data originating radio sending multiple frames of data.

radio returns (in TP5) an acknowledge message with one or more zeros in the ACKMAP bit map (ACK_0). After inspecting the ACK MAP field, the data originating radio resends those packets that the data receiving radio did not receive correctly in another data frame (TP8). The data

TABLE 3

|                  | 1          | 2          | 3    | 4          | 5                 | 6     | 7          | 8          |
|------------------|------------|------------|------|------------|-------------------|-------|------------|------------|
| DOR (ID = 1)     |            | DATA       |      |            |                   |       |            | DATA_L     |
| WC               | SYNC (1)   | SYNC (1)   | DATA | SYNC (2)   | SYNC (2)          | ACK_1 | SYNC (1)   | SYNC (1)   |
| DRR (ID = 2)     |            |            |      |            | ACK_1             |       |            |            |

|                  | 9          | 10         | 11         | 12         | 13         | 14                 | 15         |
|------------------|------------|------------|------------|------------|------------|--------------------|------------|
| DOR (ID = 1)     |            |            |            |            |            | DROP (0)           |            |
| SC               | DATA_L     | SYNC (2)   | SYNC (2)   | ACK_F      | SYNC (1)   | SYNC (1)           | S_ DROP    |
| DRR (ID = 2)     |            |            | ACK_F      |            |            |                    |            |

A multiple frame sequence is similar to several single frame data messages. After receiving the first data frame, the data receiving radio sends an ACK_1 message indicating that all packets were received correctly. For the final data frame (TP8), the data originating flag L is set, and the data receiving radio returns a final acknowledge message (TP11). The data originating radio receives the final acknowledge message, and having no more data to send, transmits a DROP message to the working channel repeater to end the call. Again, each time the working channel repeater receives a message from one radio, it switches the x value in the SYNC message to the other radio ID.

Table 4 illustrates a data sequence where an error in transmission occurs and the data originating radio repeats a data frame.

originating radio receives the final acknowledge message (ACK_F) and sends the drop message (TP14).

Table 5 illustrates the communications sequence where the data receiving radio returns a data frame.

TABLE 4

|                  | 1          | 2          | 3      | 4          | 5                 | 6     | 7          | 8          |
|------------------|------------|------------|--------|------------|-------------------|-------|------------|------------|
| DOR (ID = 1)     |            | DATA_L     |        |            |                   |       |            | DATA_L     |
| WC               | SYNC (1)   | SYNC (1)   | DATA_L | SYNC (2)   | SYNC (2)          | ACK_0 | SYNC (1)   | SYNC (1)   |
| DRR (ID = 2)     |            |            |        |            | ACK_0             |       |            |            |

|                  | 9          | 10         | 11         | 12         | 13         | 14                 | 15         |
|------------------|------------|------------|------------|------------|------------|--------------------|------------|
| DOR (ID = 1)     |            |            |            |            |            | DROP (0)           |            |
| WC               | DATA_L     | SYNC (2)   | SYNC (2)   | ACK_F      | SYNC (1)   | SYNC (1)           | S_ DROP    |
| DRR (ID = 2)     |            |            | ACK_F      |            |            |                    |            |

This scenario assumes that the data receiving radio does not receive all the packets correctly. Therefore, the receiving

TABLE 5

| | 1 | 2 | 3 | 4 | 5 | 6 |
|---|---|---|---|---|---|---|
| DOR (ID = 1) | | DATA_L | | | | |
| WC | SYNC (1) | SYNC (1) | DATA_L | SYNC (2) | SYNC (2) | ACK_0 DATA_L |
| DRR (ID = 2) | | | | | ACK_0 DATA_L | |
| DT2 | | | | DATA | | |

| | 7 | 8 | 9 | 10 | 11 | 12 |
|---|---|---|---|---|---|---|
| DOR (ID = 1) | | ACK_F | | | | |
| WC | SYNC (1) | SYNC (1) | ACK_F | SYNC (2) | SYNC (2) | S_DROP |
| DRR (ID = 2) | | | | | DROP (0) | |
| DT2 | | | | | | |

In time period 2, the data originating radio sends a single data frame DATA_L. The data receiving radio receives it and forwards it to data terminal DT2 (TP4). While the data receiving radio is switching from receive to transmit mode, it receives a data message from data terminal DT2 and sends the data message along with the ACK MAP acknowledgement to the working channel repeater (TP5). The data originating radio receives the data message and forwards it to the data terminal DT1. The data originating radio switches to transmit mode and sends a final acknowledge message to the data receiving radio for the data just received. Having no more data to send, the data receiving radio sends a DROP message (TP11). This data exchange between the originating and receiving radios could continue with data being passed back and forth alternately between the two data terminals DT1, DT2 and messages being arbitrated over the radio working channel by switching radio IDs in the sync signals. Indeed, in the above example, the repeater changed the radio ID four times. Moreover, a large data file could also be sent from data terminal to the other using this technique with each data frame being acknowledged.

Figures 4A, 4B:
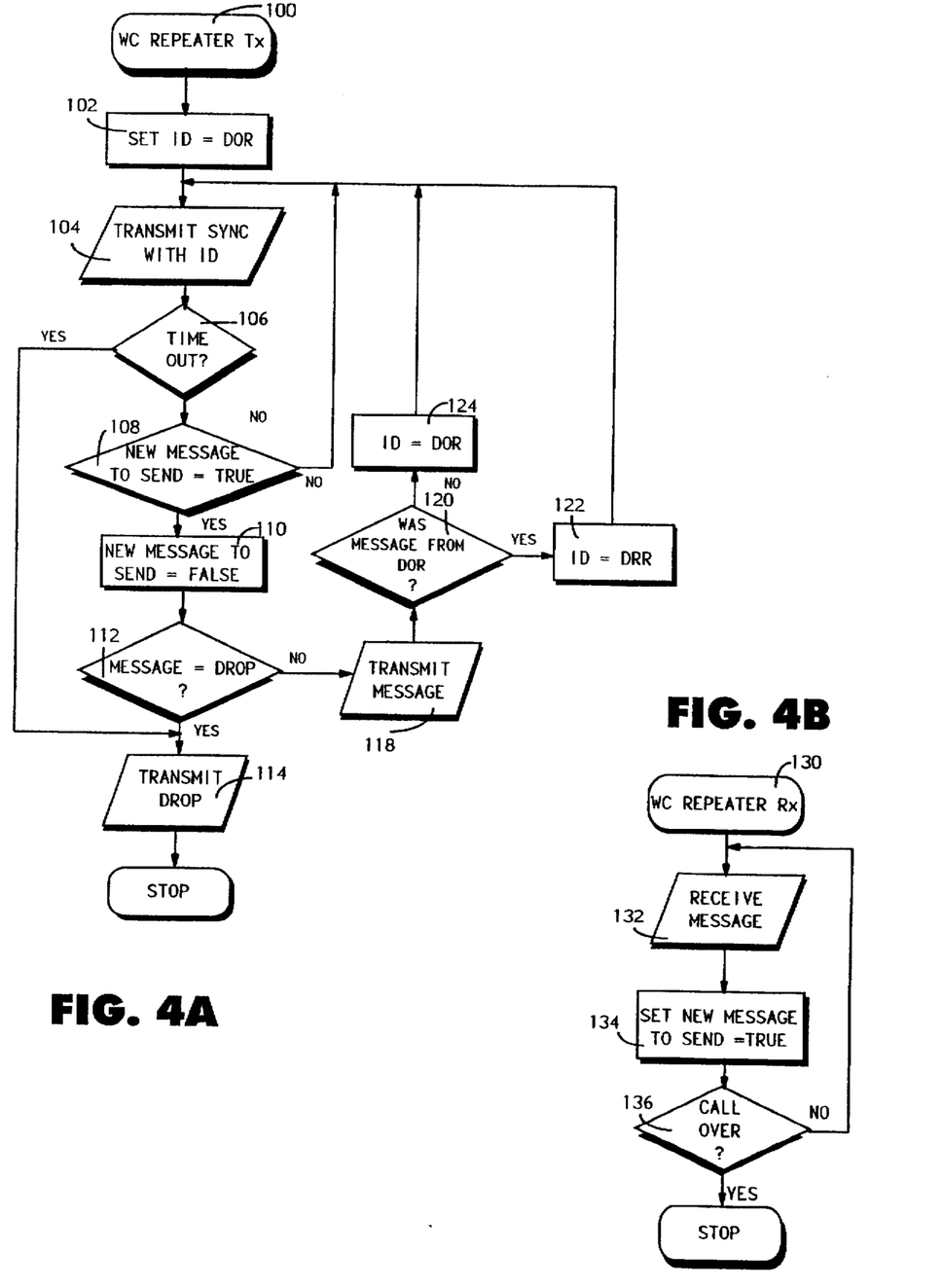
FIGS. 4(a) and 4(b) are flowchart diagrams illustrating procedures performed by the working channel repeater in accordance with the invention.

Example procedures performed by the working channel repeater in implementing the present invention are shown in FIGS. 4(a) and 4(b). FIG. 4(a) illustrates the working channel repeater flow in transmit mode (block 100). The working channel repeater sets the ID field in the working channel sync message to the ID of the data originating radio for the initial data transmission after radio working channel set-up (block 102). The repeater thereafter transmits a sequence of sync messages with the data originating radio ID (block 104).

The repeater checks to see if a time out period is expired (block 106). While only a single time out decision block is included for a maximum idle time limit during which no data message is received by the working channel repeater from either the data originating or receiving radios, an additional time out decision block could be included to limit the maximum data call length as well. In decision block 108, the working channel repeater determines whether a new message to send flag has been set. If not, it returns to block 104 to continue sending sync signals. Otherwise, the repeater resets that flag (block 110), and determines whether the message to be sent is a drop message (block 112). If so, the drop message is transmitted in block 114, and the call ends. If the message to be sent is not a dropped message, it is transmitted (block 118). A decision is made whether the message was from the data originating radio (block 120). If so, the ID in the working channel sync signal is set to the ID of the data receiving radio (block 122), and control returns to block 104. Otherwise, the sync ID is set to the ID of data originating radio (block 124).

FIG. 4(b) illustrates procedures performed by the working channel repeater in received mode (block 130). The working channel repeater receives a message in block 132, and sets the new message to send flag equal to true in block 134. A decision is made in block 136 whether the call is over, and if not, control returns to block 132.

Figure 5:
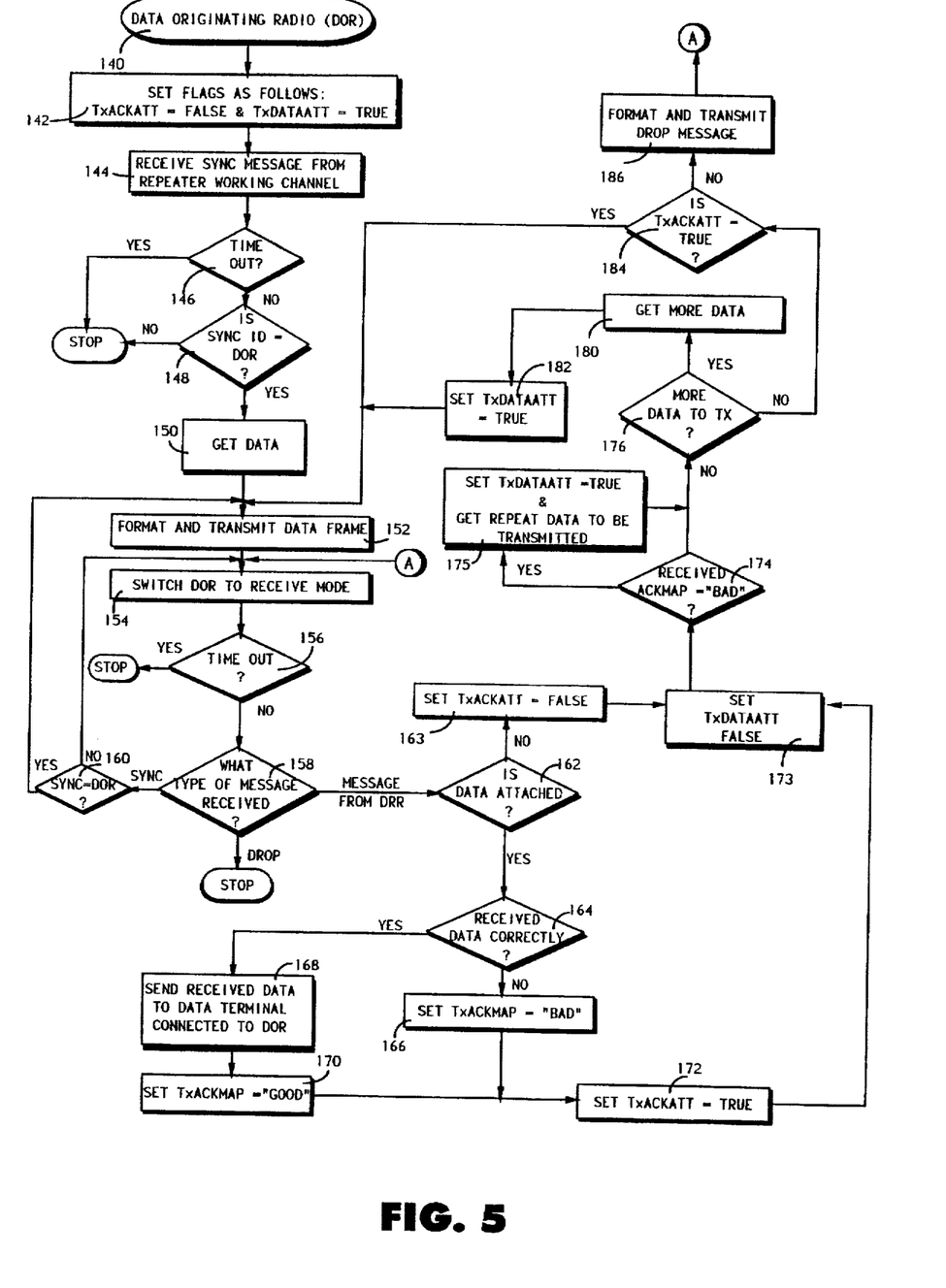
FIG. 5 is a flowchart diagram illustrating procedures performed by a data message originating radio in accordance with the present invention.

FIG. 5 illustrates a set of example procedures performed by the data originating radio in implementing the present invention (block 140). Initially, the data originating radio sets a transmit acknowledge attached flag (TxACKATT) to FALSE and a transmit data attached flag (TxDATAATT) to TRUE (block 142). The data originating radio tunes to the received frequency of the working channel and processes the received sync message to obtain synchronization (block 144). A decision is made in block 146 whether the call has timed out. If not, a decision is made in block 148 whether the transmitted sync ID is the same as the ID for the data originating radio. If it is, data is fetched from the data terminal buffer (block 150), and the originating radio formats and transmits a data frame over the transmit working channel frequency (block 152).

The originating radio then switches to receive mode and tunes to the received RF working channel frequency (block 154). Again, time out expiration is checked in block 156, and the data originating radio determines in decision block 158 what type of message is received. If a dropped message is received, the call is ended. If a sync message is received, a decision is made in block 160 whether the sync ID corresponds to the data originating radio ID. If so, control returns to format and transmit a data frame in block 152 to retransmit the data; otherwise, control returns to block 154 since the originating radio does not have permission to transmit.

If the message is from the data receiving radio, a decision is made in block 162 whether data is attached. If data is attached, a decision is made in block 164 whether the data is received correctly. If not, the transmit acknowledge map is set to "bad" (block 166), and the transmit acknowledge attach flag is set to TRUE (block 172). If the data is received correctly, the data originating radio sends the received data to the data terminal (DT1) (block 168), and the transmit acknowledge map and transmit acknowledge attached flags are set to "good" and TRUE, respectively (blocks 170 and 172). If data is not attached in decision block 162, the transmit acknowledge attach flag is set to FALSE (block 163). After setting the transmit acknowledge attached flag (block 163 or block 172), the transmit data attached flag is set to FALSE (block 173). A decision is made in block 174 whether the received acknowledgement map is set to "bad". If it is, the data originating radio gets the data to be repeated, sets the transmit attached flag to TRUE (block 175), and proceeds to decision block 176. If not, control goes to decision block 176 to check if there is more data to transmit. Assuming there is more data to transmit, more data is obtained (block 180), the transmit data attached flag is set to TRUE (block 182), and the data message is formatted and transmitted (block 152). If not, the status of the transmit acknowledge attached flag is checked in block 184. If there is an acknowledgement to send (without data), it is formatted and transmitted in block 152. If there is no acknowledgement to send (and no data), a drop message is formatted and transmitted (block 186), and the DOR switches to receive mode in block 154 to receive the drop message from the working channel.

Figure 6:
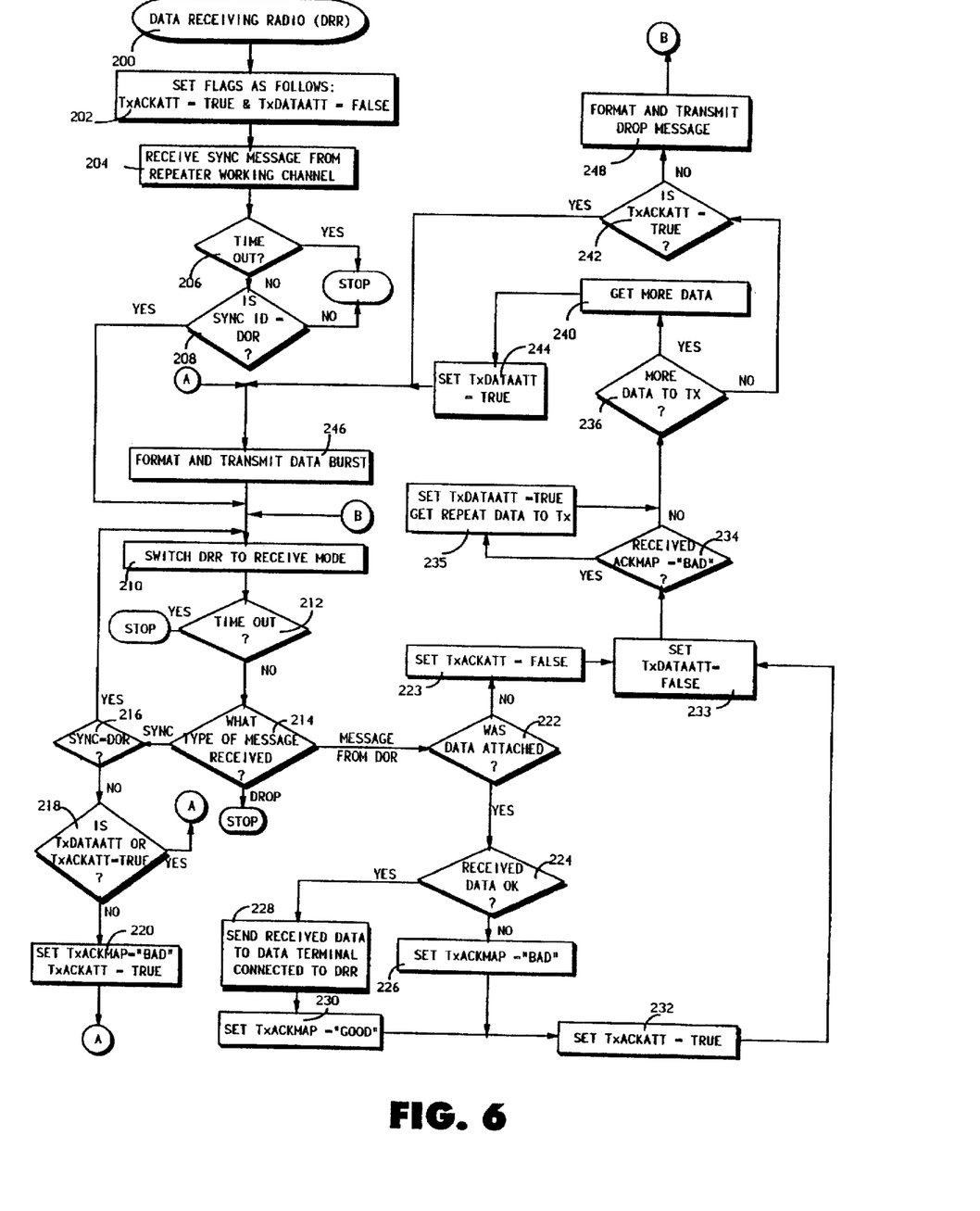
FIG. 6 is a flowchart diagram illustrating procedures performed by a data receiving radio in accordance with the present invention.

FIG. 6 illustrates a set of example procedures performed by the data receiving radio in implementing the invention (block 200). The data receiving radio sets the transmit acknowledge attached and transmit data attached flags to TRUE and FALSE, respectively (block 202). The data receiving radio tunes to the receive frequency of the working channel repeater and processes the sync message to obtain synchronization (block 204). A decision is made in block 206 whether the call has timed out. If not, a decision is made in block 208 whether the transmitted sync ID is the same as the ID for the data originating radio.

If it is, the receiving radio then switches to receive mode and tunes to the received RF working channel frequency (block 210). Again, time out is checked in block 212, and assuming it has not expired, the data receiving radio determines in decision block 214 what type of message has been received. If a drop message is received, the call is ended. If a sync message is received, a decision is made in block 216 whether the sync ID corresponds to the data originating radio ID. If so, the data receiving radio switches to receive mode in block 210. Otherwise, a decision is made in block 218 whether either of the transmit data attached or transmit acknowledgement attached flags is set to TRUE. If not, the TxACKMAP flag is set to "bad," the TxACKATT is set to TRUE (block 220), and the ACKMAP is transmitted (block 210). If either the transmit data attached flag or the acknowledge attached flag is TRUE (block 218), the data is retransmitted (block 210).

If the message is from the data originating radio, a decision is made in block 222 whether data is attached. If data is attached, a decision is made in block 224 whether the data is received correctly. If not, the transmit acknowledge map flag is set to "bad" (block 226) and the transmit acknowledge attached flag is set to TRUE (block 232). If the data is received correctly, the data receiving radio sends the received data to the data terminal (DT2) (block 228), and the transmit acknowledge map and transmit acknowledge attached flags are set to "good" and TRUE, respectively (blocks 230 and 232).

If data is not attached in decision block 222, the transmit acknowledge attach flag is set to FALSE (block 223). After setting the transmit acknowledge attached flag (block 223 or block 232), the transmit data attached flag is set to FALSE (block 233). A decision is made in block 234 whether the received acknowledgement map is set to "bad". If it is, the data originating radio gets the data to be repeated, sets the transmit attached flag to TRUE (block 235), and proceeds to decision block 236. If not, control goes to decision block 236 to check if there is more data to transmit. If so, more data is obtained (block 240), and the transmit data attached flag is set to TRUE (block 244), and the data message is formatted and transmitted (block 246). If not, the transmit acknowledge attached flag is checked in block 242. If there is an acknowledgement to send (and no data), it is formatted and sent (block 248), and DRR switches to receive mode in block 210 to receive the drop from the working channel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the radio ID and the sync signals have been described as a preferred way of implementing the present invention, other types of status indicators could be communicated to the radios to indicate which radio currently has the right to transmit. Moreover, the ID could also correspond to the data processing device attached to a radio rather than an ID of the radio itself.

What is claimed is:

1. A data communications system that includes a radio link, comprising:

a full duplex radio repeater for receiving a data message over a radio frequency (RF) working channel assigned using a different RF control channel and retransmitting the received message and for transmitting a status indicator during an idle time when the repeater is not retransmitting received messages;

a first half-duplex radio that either transmits or receives signals over the assigned RF working channel;

a first device for conducting a data communication with the radio or with a second device connected to the radio over the assigned RF working channel through the repeater;

wherein during the data communication, the radio and the device monitor the status indicator to determine which of the radio or the second device and the first device is permitted to transmit a data message over the assigned RF working channel.

2. The data communications system according to claim 1, wherein the first and second devices are computers connected to the radio repeater through a data gateway, the radio and computers are assigned corresponding first and second identification numbers (IDs), and the status indicator is one of the first and second IDs.

3. The data communications system according to claim 1, wherein the first device and the radio or second device are assigned a corresponding first and second identification number (ID) and the status indicator is one of the first and second IDs.

4. The data communications system according to claim 3, wherein the repeater transmits a sequence of synchronization messages on the assigned RF working channel during the idle time, each synchronization message including one of the first and second IDs.

5. A radio data communications system, comprising:

a base station including plural working channel repeaters and a control channel repeater with the control channel repeater coordinating allocation of the working channel repeaters over a radio control channel to handle radio communications over corresponding radio working channels;

plural half-duplex radios which establish radio communications over available radio working channels using the radio control channel and requesting a working channel; and first and second computers, at least one of which is connected to one of the half-duplex radios, conducting a data communication using one of the working channel repeaters over an assigned radio working channel, wherein during the data communication, data messages from the first and second computers are exchanged using the one half-duplex radio in simulated full duplex message exchange without collision on the assigned radio working channel.

6. The radio data communications system according to claim 5, wherein the one of the first and second computers originates more than one data message which is communicated over the assigned working channel.

7. The radio data communications system according to claim 5, wherein the one working channel repeater transmits a status indicator over the assigned radio working channel which indicates whether a data message originated by the first computer or a data message originated by the second computer may be transmitted over the assigned radio channel.

8. A radio communications system, comprising:

a base station including plural working channel repeaters and a control channel repeater with the control channel repeater coordinating allocation of the working channel repeaters over a radio control channel to handle radio communications over corresponding radio working channels;

plural radios which establish radio communications over available radio working channels using the radio control channel and requesting a working channel; and first and second computers, at least one of which is connected to one of the radios, conducting a communication, data messages from the first and second computers are exchanged without collision on the assigned radio working channel, wherein the one working channel repeater transmits a synchronization message that includes the status indicator during an idle period when the one repeater is not repeating a data message.

9. The radio data communications system according to claim 7, wherein the status indicator corresponds to an identification number of one of the first and second computers.

10. The radio data communications system according to claim 7, wherein both of the first and second computers are connected to corresponding first and second radios and the status indicator corresponds to an identification number of one of the first and second radios.

11. In a radio data communications system including a full duplex radio repeater for receiving a data message over an assigned radio channel and retransmitting the received message, first and second radios that transceive data messages over the assigned radio channel, a method comprising the steps of:

establishing a data communication between the first and second radios over the assigned radio channel;

transmitting a status indicator;

transmitting a sequence of synchronization messages on the assigned RF channel during an idle time when the repeater is not retransmitting received data messages, each synchronization message including the status indicator; and monitoring the status indicator to determine which of the radios is permitted to transmit a data message over the assigned RF channel.

12. The method according to claim 11, wherein first and second computers are connected to the first and second radios, respectively, the method further comprising the steps of:

assigning the first and second computers a corresponding first and second identification numbers (IDs) with the status indicator being one of the first and second IDs.

13. The method according to claim 11, the method further comprising the step of:

assigning the first device and second radios a corresponding first and second identification number (ID) with the status indicator being one of the first and second IDs.

14. In a radio data communications system including a base station having plural working channel repeaters and one control channel repeater, and first and second radios, a radio data communications method comprising the steps of:

the first radio requesting a radio working channel over the radio control channel to conduct a data communication including a first data message with the second radio;

the control channel repeater allocating one of the working channel repeaters to handle the data communication and transmitting over the radio control channel to the first and second radios an assigned radio working channel to handle the data communication;

transmitting the first data message from the first radio over the assigned working channel;

receiving the first data message at the one working channel repeater and retransmitting the first data message to the second radio and indicating that only the second radio is currently permitted to transmit on the assigned radio working channel; and transmitting a second data message from the second radio over the assigned working channel intended for the first radio using the one working channel repeater.

15. The method in claim 14, further comprising:

transmitting over the assigned working channel to the first and second radios a status indicator indicating which of the first and second radios is currently permitted to transmit a data message on the assigned working channel, wherein the first and second radios monitor the working channel before transmitting a data message.

16. The method in claim 15, further comprising:

transmitting a sequence of synchronization signals including the status indicator over the working channel.

17. The method in claim 14, further comprising:

(a) assigning the first and second radios a corresponding first and second identification number;

(b) transmitting on the assigned radio working channel a message that includes one of the first and second identification numbers which currently is permitted to transmit a data message over the assigned radio working channel;

(c) after receiving at the one working channel repeater the data message one of the first and second radios, changing the identification number transmitted on the assigned radio working channel to the other of the first and second identification numbers to thereby permit the other of the first and second radios to transmit a responsive data message to the data message transmitted in step (b).

18. The method in claim 17, wherein each radio monitors the assigned working channel to determine if the message transmitted in step (b) includes the identification number for that radio, and if not, returning to or switching into a receive mode.

19. The method in claim 14, wherein the second message is a first acknowledgement message which confirms receipt by the second radio of the first data message and identifies any erroneous portions of the first data message as received, the method further comprising transmitting along with the first acknowledgement message a third data message originated from the second terminal.

20. The method in claim 19, wherein the first radio processes the first acknowledgement message and retransmits those portions of the first data message identified as erroneous along with a second acknowledgement signal over the assigned radio working channel.

21. The method in claim 15, wherein after the first radio transmits a data message, the first radio checks the assigned working channel to determine if the status indicator currently indicates the second radio, and if not, the first radio retransmits the data message.

22. The method in claim 15, wherein if the status indicator indicates that the second radio is currently permitted to transmit and then the first radio detects that the status indicator changes to indicate that the first radio may transmit having not received a recent message from the second radio, the first radio transmits a message requesting the other radio to retransmit a last message transmitted by the second radio.

23. The method in claim 21, wherein after the first radio transmits the data message, the first radio starts a time out period during which the first radio must detect an acknowledge signal from the second radio or that the status indicator indicates that the first radio is currently permitted to transmit on the assigned working channel otherwise the first radio ends the data communication.

24. The data communications system in claim 1, wherein the data communications system is a transmission-trunked system and the assigned working channel is a transmission-trunked channel, and wherein during a transmission-trunked data communication, the first device and the radio or the second device connected to the radio use the status indicator to exchange messages over the assigned RF channel without collision.

25. The data communications system in claim 1, wherein the data communications system is a transmission-trunked system and the assigned working channel is a transmission-trunked channel, and wherein during a transmission-trunked data communication, the first device and the radio or the second device connected to the radio use the status indicator to exchange messages over the assigned RF channel without requesting and setting up a new working channel for each message.

26. The radio data communications system in claim 7, wherein the data communications system is a transmission-trunked system and the assigned working channel is a transmission-trunked channel, and wherein during a transmission-trunked data communication, plural data messages are exchanged between the first and second computers without having to establish a new radio working channel.

27. The method in claim 14, wherein the data communications system is a transmission-trunked system and the assigned working channel is a transmission-trunked channel, and further comprising:

exchanging plural data messages over the same assigned radio working channel, whereby a new working channel is not established for each exchanged message.

* * * * *